US005742838A

United States Patent [19]
Lim et al.

[11] Patent Number: 5,742,838
[45] Date of Patent: Apr. 21, 1998

[54] METHOD FOR CONVERSION MODE SELECTION IN HANGEUL TO HANJA CHARACTER CONVERSION

[75] Inventors: Chan S. Lim, Potomac; Victor Wu, Bethesda, both of Md.; Kyu Y. Rho, Seoul, Rep. of Korea

[73] Assignee: International Business Machines Corp., Armonk, N.Y.

[21] Appl. No.: 136,431

[22] Filed: Oct. 13, 1993

[51] Int. Cl.$^6$ .................................................. G06F 17/21
[52] U.S. Cl. .................................. 395/797; 395/751
[58] Field of Search ................... 364/419.01, 419.02, 364/419.04, 419.05, 419.09

[56] References Cited

U.S. PATENT DOCUMENTS

| | | | |
|---|---|---|---|
| 4,498,148 | 2/1985 | Glickman | 364/419.12 |
| 4,543,631 | 9/1985 | Kurosu et al. | 364/419.09 |
| 4,559,614 | 12/1985 | Peek et al. | |
| 4,737,779 | 4/1988 | Somigli et al. | 340/745 |
| 4,745,561 | 5/1988 | Hirosawa et al. | 340/751 |
| 4,751,740 | 6/1988 | Wright | 382/1 |
| 4,755,955 | 7/1988 | Kimura et al. | 340/724 |
| 4,831,529 | 5/1989 | Miike et al. | 364/419.02 |
| 4,868,913 | 9/1989 | Tse-Kai | 340/711 |
| 4,933,880 | 6/1990 | Borgendale et al. | |
| 4,949,287 | 8/1990 | Yamaguchi et al. | |
| 4,951,202 | 8/1990 | Yan | 364/419.09 |
| 4,954,979 | 9/1990 | Elbner et al. | |
| 5,043,712 | 8/1991 | Kihara et al. | 340/735 |
| 5,079,701 | 1/1992 | Kuga et al. | 364/419.11 |
| 5,084,817 | 1/1992 | Kumano et al. | 364/2 |
| 5,084,820 | 1/1992 | Nagaya et al. | 395/146 |
| 5,091,878 | 2/1992 | Nagasawa et al. | 364/419.17 |
| 5,270,927 | 12/1993 | Sproat | 364/419.09 |
| 5,285,387 | 2/1994 | Kurahara et al. | 364/419.09 |
| 5,319,552 | 6/1994 | Zhong | 364/419.09 |
| 5,337,233 | 8/1994 | Hofert et al. | 364/419.19 |

FOREIGN PATENT DOCUMENTS

| | | | |
|---|---|---|---|
| 60-225973 | 11/1985 | Japan | 364/419.09 |
| 59-153232 | 1/1994 | Japan | 364/419.09 |

OTHER PUBLICATIONS

IBM Manual, "DOS Bunsho (Language) Program II Operation Guide" (N:SH18-2131-2) (Partial Translation of p. 79).

Primary Examiner—Jack B. Harvey
Assistant Examiner—Sumati Lefkowitz
Attorney, Agent, or Firm—Edward H. Duffield

[57] ABSTRACT

A system and method for converting Hangeul characters to Hanja characters in the Korean language. The method and system permit the user to select the conversion mode as either a character mode or a word based mode to provide flexible and accurate conversion operations.

4 Claims, 12 Drawing Sheets

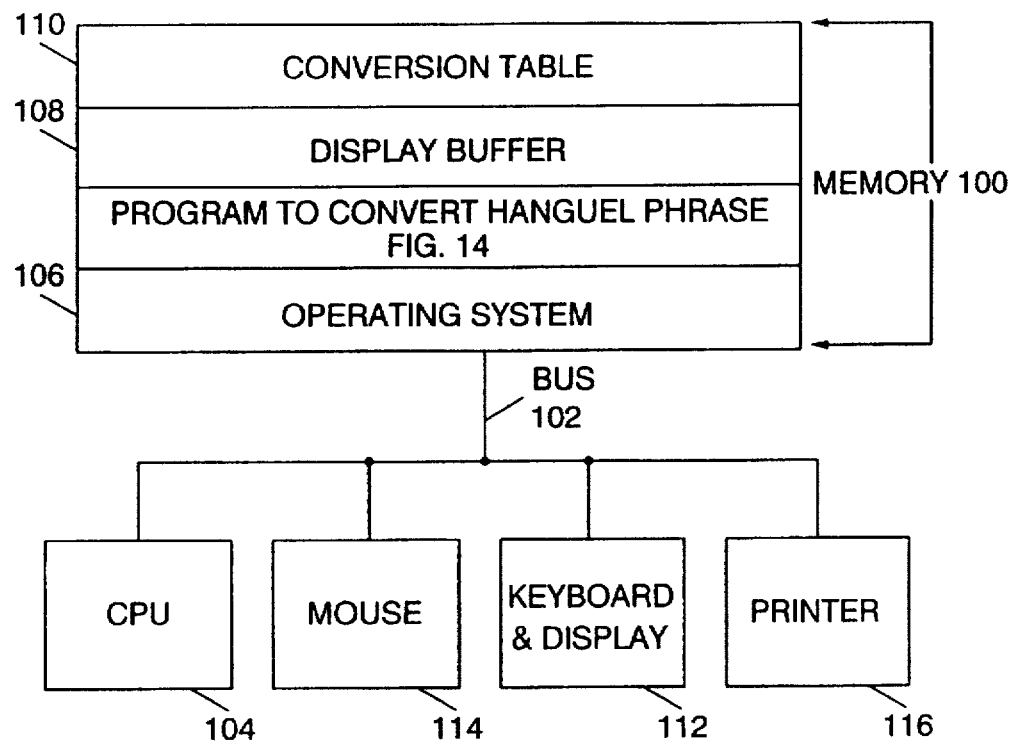

Y1 Y2 Y3 Y4 bb Y5 Y6

Where Y# = One Hanguel character
bb = double byte space used as delimiter

Y1 Y2 Y3 Y4 bb Y5 Y6

Where Y# = One Hanguel character
bb = double byte space used as delimiter

| K1 | K2 | K3 | K4 | K5 | K6 |
|---|---|---|---|---|---|
| Hanja Phrase 1 | Hanja Phrase 2 | Hanja Phase 3 | Hanja Phrase 4 | Hanja Phrase 5 | Hanja Phrase 6 |

Where K# = One Hanja character
bb = double byte space used as delimiter

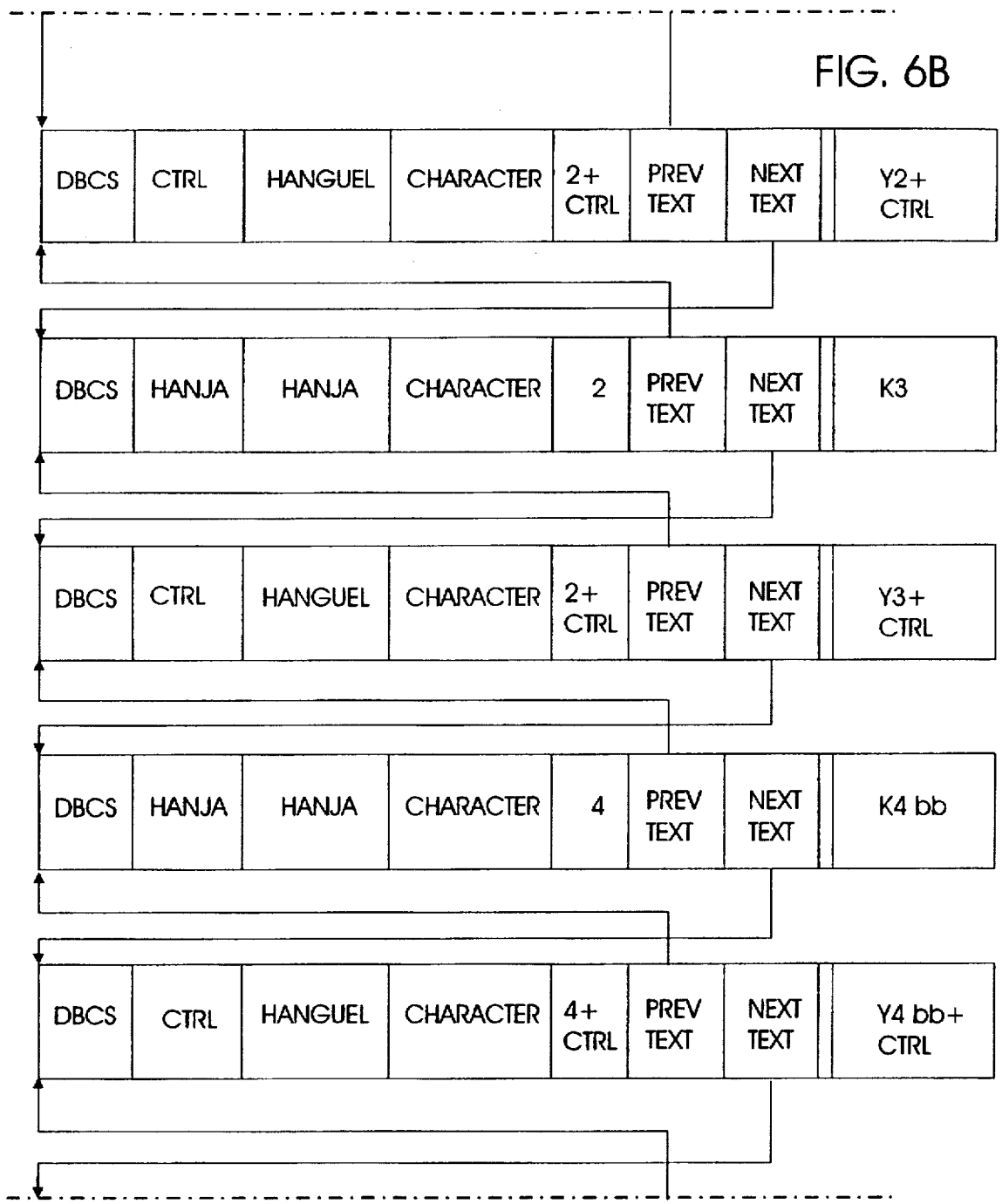

| Hanja Phrase 1 | Hanja Phrase 2 |

Where K# = One Hanja character
bb = double byte space used as delimiter

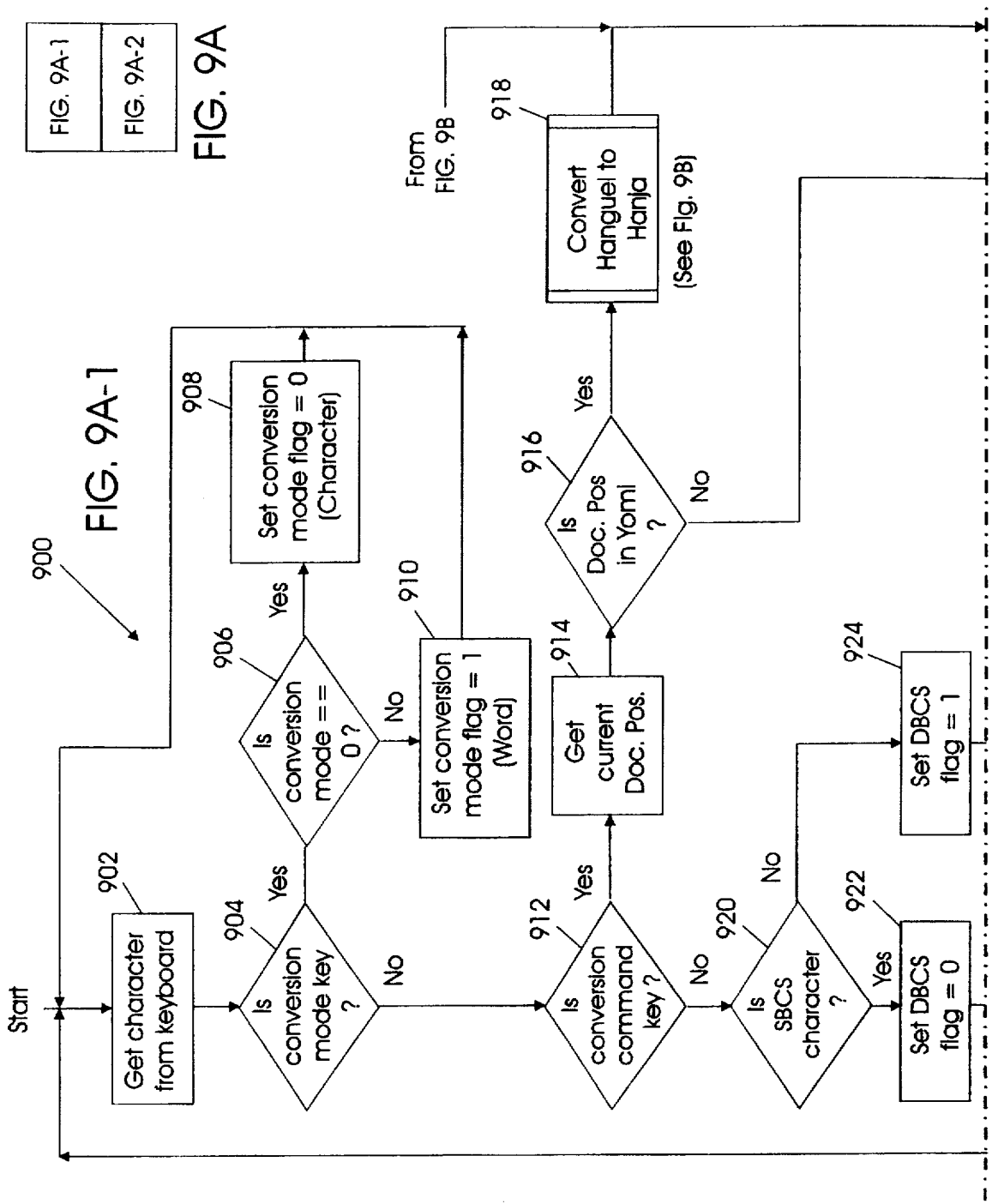

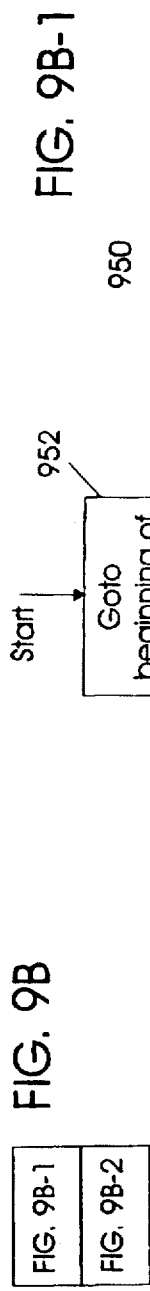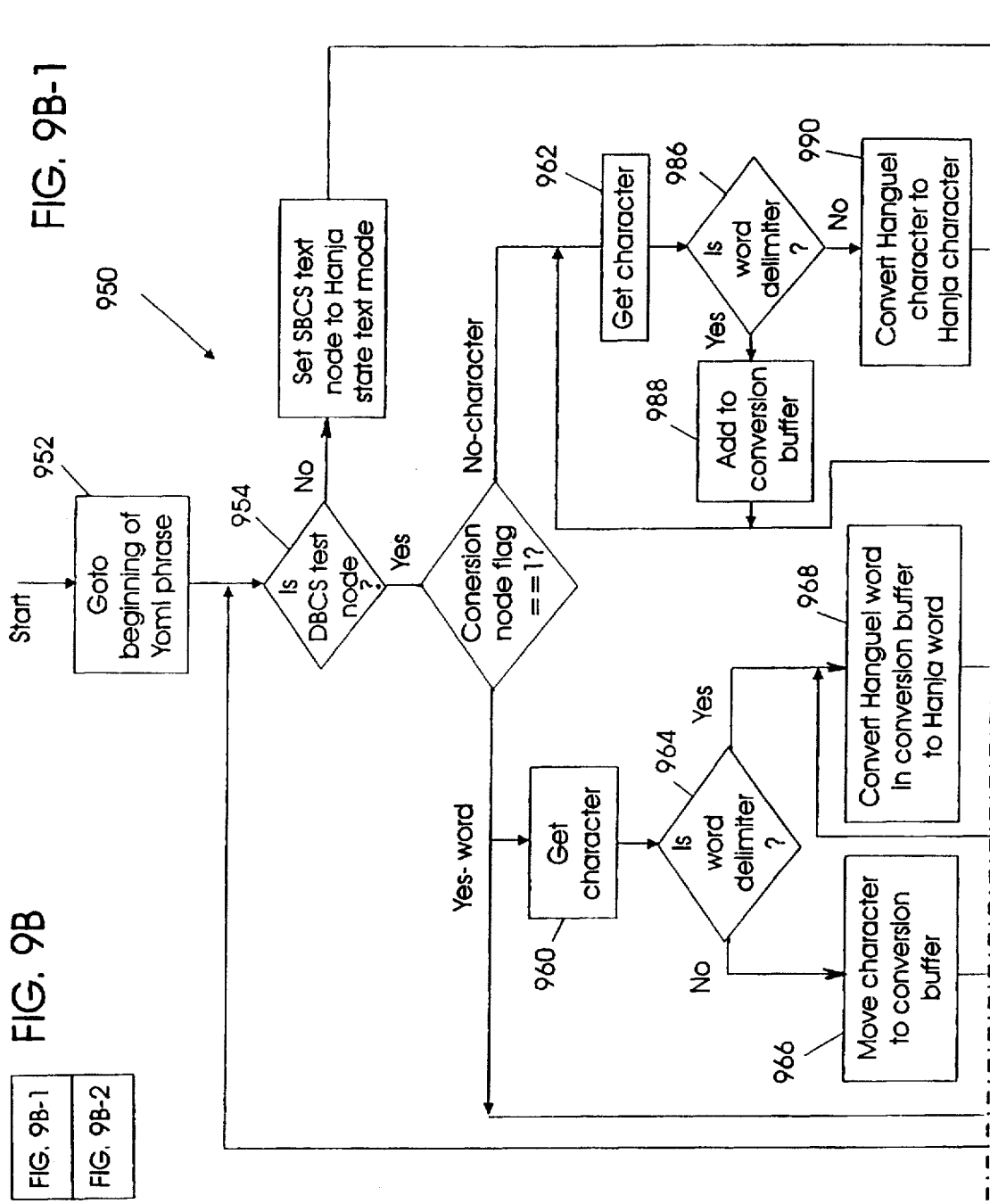
FIG. 9B
FIG. 9B-1

METHOD FOR CONVERSION MODE SELECTION IN HANGEUL TO HANJA CHARACTER CONVERSION

BACKGROUND OF THE INVENTION

1. Technical Field

The invention disclosed broadly relates to data processing systems and more particularly relates to an improved system and method for converting Hangeul to Hanja characters in the Korean language.

2. Background Art

Related copending patent application entitled "Style Component of a WYSIWYG Text editor," by K. W. Borgendale, et al., filed May 14, 1990, Ser. No. 07/523,082, now U.S. Pat. No. 5,276,793, assigned to IBM and incorporated herein by reference.

Related copending patent application entitled "Method and System for Storing Multiple, Modifiable Yomi and Kanji String in a Structured Document," by Chan S. Lim, et al., filed Oct. 29, 1992, Ser. No. 07/968,017, assigned to the IBM Corporation and incorporated herein by reference.

The following terminology is used throughout this patent application and can be used for data base searches.

Hangeul—Hangeul is the Korean Character. One Hangeul character represents one phonetic syllable. One Hangeul character is made up of several Jamo (consonants and vowels). One syllable can be made up of initial consonant-vowel or initial consonant-vowel-final consonant. The number of Jamo in the Korean alphabet are 52. There are 21 vowels and 31 consonants. Of the 52 Jamo, there are 24 basic Jamo and the rest compound Jamo which are a combination of two (in the case of consonants) or up to three (in the case of vowels) basic Jamo. Thus one Hangeul character can be composed of two to four basic Jamo.

Hanja (Kanji)—Hanja is a set of ideographic characters originally derived from Chinese characters (Kanji). Each Hanja has one or more pronunciations associated with it, and the way it is actually pronounced can be determined only after looking at the context (surrounding characters) in which it occurs. Nouns, verb stems, and adjectives are usually written in Hanja. Chinese numbers are also included in this category.

Normal State—This state is the final text state. The text in normal state may no longer be manipulated with Hanja conversion commands, whether in conversion mode or non-conversion mode.

Yomi State—The Yomi state indicates that the text has not been converted. Yomi text can be Hangeul. Yomi state text can be converted to, Hanja. when in Hanja conversion mode.

Hanja (Kanji) State—The Hanja state indicates that the text has been converted but not yet changed to normal state. The text in Hanja state can be changed back to the original Yomi state text if the document is in conversion mode.

Active State—A Yomi or Hanja state string is in active state if it is ready for Hanja conversion commands, i.e., any conversion commands which are issued will be applied to the active-state text. Text can only be in active state when conversion is enabled, i.e., the system is in conversion mode. In the examples the active-state text will be highlighted in reverse video.

Hanja Phrase—A Hanja character or string of Hanja characters which corresponds to a string of Yomi characters in one of the conversion dictionaries used by the operating system.

Hangeul to Hanja Conversion—Each Hanja has a pronunciation which is represented by one Hangeul character, that is, it is pronounced with one syllable. Many Hanja characters have the same pronunciation, so one Hangeul can represent many Hanja characters. This process of translating Hangeul into the correct Hanja is called Hanja conversion.

Word—Word is a contiguous string of non-delimiter characters.

Delimiter—Characters that may not appear in words and therefore delimit them. Delimiters include characters such as space,.& ( ), etc.

Structured Document—A document which has a defined hierarchy of elements such as that defined by SGML.

Current Document Position—The document position which determines the focal point for an editing operation.

Current editors provide a Hangeul-Hanja conversion function. However, when in conversion mode, the user's movement is restricted to the active phrase area, i.e., an area specifically designated for entering Yomi and converting it to Hanja before placing the normalized Hanja characters actually into the document. The user may not move the cursor to any other part of the document until he has finished converting the Hanja and placed the normalized Hanja characters into the document. For example, the user is in Hanja conversion mode and enters five Hangeul characters and converts them to Hanja. Cursor movement is now restricted to the Hanja phrase text area. Only after the user fixes (normalizes) the Hanja characters is the cursor free to move to other positions within the document. Therefore, due to this restriction, there can be only one active Hanja state string within the entire document.

Current editors provide a Hangeul-Hanja conversion function which allows the user to convert a Hangeul character to one of the candidate Hanja character. When the user wants to convert multiple Hangeul characters to the equivalent Hanja characters, each Hangeul character must be converted to a Hanja character one character at a time until the last character of the string is encountered. For example, when the user wants to convert five Hangeul characters in a Yomi phrase, the user MUST repeat the following steps five times to complete the conversion.

1. invokes the Hanja Conversion command
2. selects a Hanja character from the list of Hanja candidates
3. moves cursor to the next character Therefore, this technique to reach the final conversion is not only a time consuming operation, but it is also a tedious operation to select a proper Hanja from the list of Hanja candidates for advanced users. The object of the invention described is to provide the user a method to perform the Hanja conversion with a single operation with "word" or "character" option regardless of the Yomi phrase consisting of a single or multiple characters.

OBJECTS OF THE INVENTION

It is therefore an object of the invention to provide an improved technique for converting Hangeul characters to Hanja characters in the Korean language.

It is still another object of the invention to provide an improved technique to provide in an single operation, the conversion of either single Hangeul characters or multiple Hangeul characters into corresponding Hanja characters, in an improved manner.

SUMMARY OF THE INVENTION

These and other objects, features, and advantages are accomplished by the invention. In traditional Korean writing, consecutive Hangeul characters are clustered into one or multiple Hangeul characters which are separated by delimiters from the next cluster, in a manner similar to the provision of spaces between words in Western text. In accordance with the invention, the user is given the option of selecting two modes for the character conversion from Hangeul to Hanja characters. The first conversion mode is a character conversion wherein each consecutive Hangeul character is analyzed and its corresponding Hanja characters found in a table lookup operation and returned to the user. In the second conversion mode called the word conversion mode, in accordance with the invention, clusters of Hangeul characters between consecutive delimiters are taken together and are used as the subject for a table lookup operation and the corresponding Hanja character is returned from the conversion table.

Further in accordance with the invention, a structured document editor feature of the invention includes a normal state, a Yomi or Hangeul state and a Hanja state and an active state. When the operator types Hangeul characters on a keyboard, the corresponding Hangeul character is directly displayed on the display. In the Hangeul state, when a Hangeul character is typed on the keyboard, a Hangeul text node structure is assembled. The text node structure in the Hangeul state will include the Hangeul character string along with control information. When the operator wishes to convert the Hangeul phrases into the corresponding Hanja phrases, the Hangeul string is accessed from the Hangeul text node structure and is subjected to a conversion process, the selection of which is based upon the user's input as being either word mode selection or character mode selection. The process returns each Hanja phrase and the corresponding Hangeul and a bookmark to the conversion table which was used in carrying out the conversion. In another feature of the invention, the returned Hanja phrase and the corresponding Hangeul phrase and the bookmark are assembled into a new text node structure. The new text node structure assembles a Hanja phrase structure and a corresponding Hangeul phrase structure for each Hanja phrase returned in the conversion process. The Hanja phrase structure includes a pointer to the corresponding Hangeul phrase structure and the Hangeul phrase structure in turn includes a return pointer to the Hanja phrase structure. Also included in the Hanja phrase structure and the Hangeul phrase structure is control information which provides for the display of the Hanja phrase structure which will substitute the Hangeul phrase structure.

There are two basic embodiments of the invention, in the first embodiment, the user is given the option of selecting either the word conversion mode or the character conversion mode at the time of the conversion operation from the Hangeul to the Hanja characters. In the second embodiment of the invention, the user is given the option of selecting the mode of conversion at the time that the user is typing in the Hangeul characters. The second embodiment of the invention has the additional feature of storing the mode selection flag in the text node as an additional unit of control information.

DESCRIPTION OF THE FIGURES

These and other objects, features and advantages can be more fully appreciated with reference to the accompanying figures.

FIG. 1 is an architectural diagram of a data processing system for carrying out the invention.

DISCUSSION OF THE PREFERRED EMBODIMENT

Figure 3:
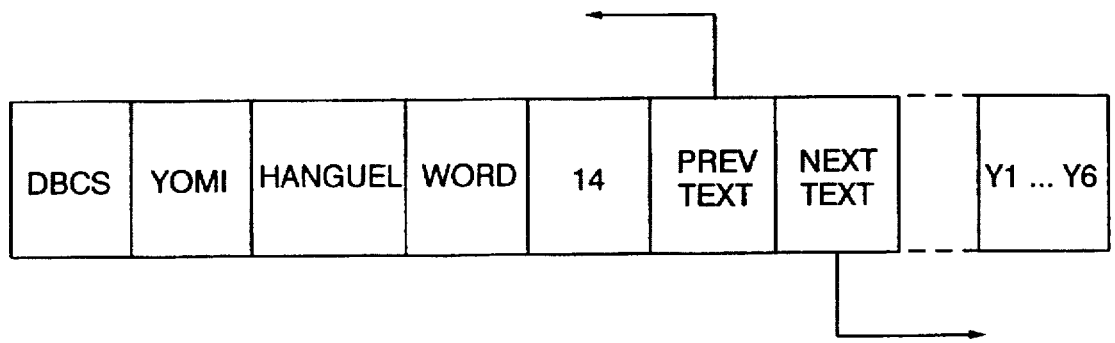
FIG. 3 is an organizational diagram showing a Yomi text node, which includes a space as the word delimiter, with the word conversion flag.
Figure 5:
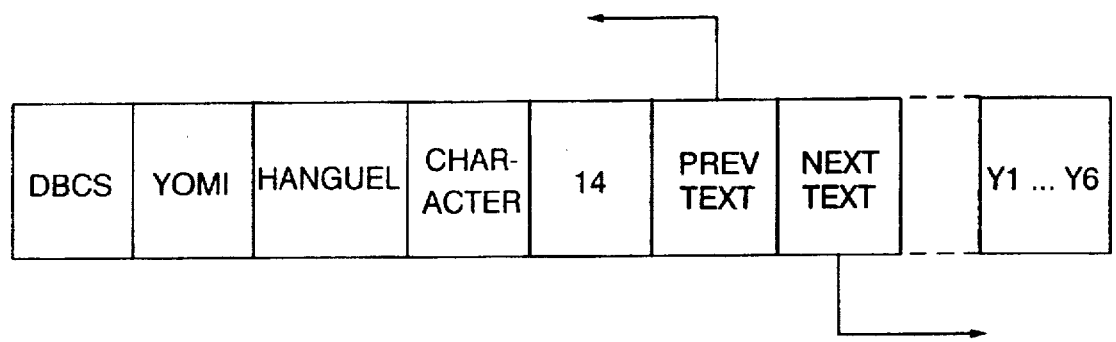
FIG. 5 is an organizational diagram showing a Yomi text node with the character conversion flag.

The overall architectural diagram of a system for carrying out the invention is shown in FIG. 1. A memory 100 is coupled over a bus 102 to a CPU 104. The memory includes programs which are a sequence of executable instructions which embody the flow diagrams of FIGS. 9A and 9B. Also included in the memory is an operating system 106, a display buffer 108 and a Hangeul to Hanja conversion table 110. Also shown in the architectural diagram of FIG. 1 is a keyboard and display 112, a mouse pointing device 114, and a printer 116.

DOCUMENT STRUCTURE AND CONVERSION EXAMPLES FOR DBCS INVENTIONS

The purpose of these examples is to demonstrate the internal document structure which facilitates the following (Korean will be used in the examples, but the concepts extend to Traditional Chinese, and all other ideographic DBCS languages):

1. The simultaneous existence of both English and Korean text in the same document, each with a different font if so desired.
2. The simultaneous existence of multiple unconverted Yomi strings within the document, each of which may be returned to at any time (including after saving and closing the document and reinvoking it) and manipulated at will.
3. The simultaneous existence of multiple unfixed (not normalized) Hanja strings within the document, each of which may be returned to at any time and manipulated at will. Note that 2 and 3 essentially describe the ability to perform all Hangeul-Hanja conversion functions within the document at the current cursor position with no loss of information until the user requests it. This is in contrast to all known prior art in which all information necessary for Hangeul-Hanja conversion routines is lost once the user places Hanja text into the document from the Hangeul-Hanja editing window or otherwise aborts the current operation in the Hangeul-Hanja editing window.

Figures 2, 9A:
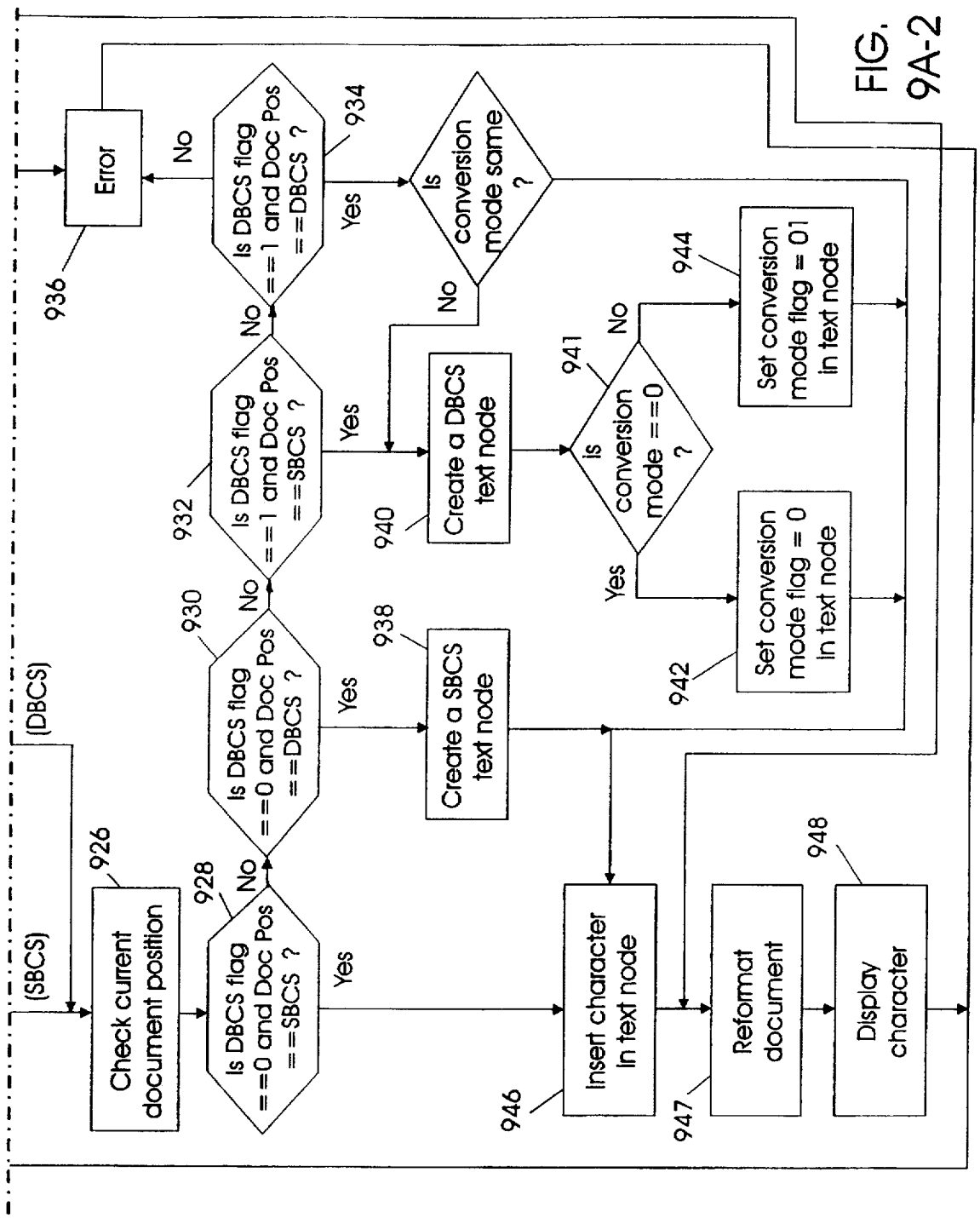
FIG. 2 is a format diagram of a generic text node, which includes the word/character flag field, in accordance with the invention.
FIG. 9A consisting of FIGS. 9A-1 and 9A-2 as shown, is a flow diagram of the method for setting the conversion mode flag and creating a text node.

The basic element containing text in the type of structured document used in these inventions is the text node. The text node contains the actual text as well as all the information necessary to maintain the state of the text in terms of font, SBCS or DBCS, Yomi (Hangeul) or Hanja, etc. FIG. 2 is a basic representation of a text node. Not all fields are represented; only those relevant to the current inventions.

1. SBCS/DBCS

Indicates whether this text node contains single-byte text or double-byte text. Text of different sizes will not appear in the same text node.

2. YOMI/HANJA/NORM/CTRL

Indicates the state that the text in the current text node is in:

YOMI: Text (usually Hangeul) which has been entered in conversion mode but which has not yet been converted to Hanja. Text will remain in this state regardless of the users actions, unless he converts it, normalizes it, or deletes it.

HANJA: Text which has been converted to Hanja characters from Yomi but which has not yet been normalized. Text in this state will still reference all of the necessary information to perform future Hangeul-Hanja conversion functions and will remain in this state until the user unconverts it, normalizes it, or deletes it.

NORM: Text which is neither in YOMI or HANJA state. This is the standard state of English text and of Korean text which will no longer be used in any conversion routines.

CTRL: Text which is control information containing the original Yomi which converted to a particular Hanja phrase and other control data passed back from the system conversion routines. There is one of these text nodes attached to each Hanja-state phrase in the document and they are not displayed. They contain all the information necessary to do further Hanja-Hangeul conversion routines on the associated Hanja phrase if requested.

Text of different states will never exist in the same text node.

3. HANGEUL/HANJA/ENGLISH

Indicates the language and type of the characters in the text node. Hangeul are phonetic character sets used for converting to Hanja. Hanja is the full set of Kanji ideographic characters which is used by Koreans. English is English. Text in different languages/types will never exist in the same text node.

4. CHARACTER/WORD CONVERSION FLAG

Indicates the method for the Hanja conversion for all characters in the Yomi text node.

5. TEXT LENGTH

This is the length, in bytes, of the actual text in the current text node.

6. PREV TNODE

This is a pointer to the previous text node in the document.

7. NEXT TNODE

This is a pointer to the next text node in the document.

8. TEXT POINTER

This is a pointer to a memory area which contains the actual text data in this text node.

These text nodes will be used to describe the storage of text in a structured document and to demonstrate how the document structure changes to allow SBCS and DBCS text to exist simultaneously in the document with different fonts, how to maintain multiple Yomi and/or Hanja strings, how the conversion process from Yomi to Hanja works.

EXAMPLES

The following examples describe the accompanying figures and demonstrate the internal structure necessary to support the inventions. The following conventions are used:

K#=A Hanja Character

Y#=A Yomi Character (In these examples, Hangeul)

English characters will be represented as is

FIG. 3—UNCONVERTED YOMI STRING

The unconverted Yomi string is the word conversion mode. This text string is double-byte Hangeul text in Yomi state with the word conversion flag set. The text is ready for word conversion to Hanja. All of the Yomi text is contiguous and in one text node. It consists of seven, double byte characters, including the "blank" bb.

FIG. 4—HANGEUL-HANJA CONVERSION BY WORD MODE

This figure shows the first mode for conversion of the Yomi string to Hanja by the word conversion method. The editor extracts a word based on the word delimiters such as space (bb), comma, period, single-byte character, etc. from the current Yomi string and passes one word at a time to the system, which uses the system conversion dictionary (which may be appended to by the user) to convert the string to Hanja. For each word, the most common Hanja translation (there may be many) is selected.

The system returns to the editor, a list of the Hanja candidates. The editor will present the list of candidates to the user and the Hanja candidate selected by the user will replace the current Yomi word. Each Hanja phrase is followed by control information which consists of the original Yomi character string for just that Hanja phrase and certain other information which will be needed by the system to expedite any future Hangeul-Hanja conversion routines performed on that Hanja phrase (such as finding the next Hanja candidate for the Yomi if the default is not what the user wanted).

FIG. 5—IS THE YOMI STRING IN TEE CHARACTER MODE

This text string is double-byte Hangeul text in Yomi state and the conversion method is in the character mode.

FIG. 6—HANGEUL-HANJA CONVERSION BY CHARACTER

This figure shows the conversion of the Yomi string of FIG. 3 to Hanja by the character conversion method. The editor extracts a character from the current Yomi string and passes one character at a time to the system which uses the system conversion dictionary (which may be appended by the user) to convert the string to Hanja. For each character, the most common Hanja translation (there may be many) is selected.

The system returns to the editor a list of the Hanja candidates. The editor will present the list of candidates to the user or selects the first candidate as a default. The selected Hanja candidate will replace the current Yomi word. Each Hanja character is followed by control information which consists of the original Yomi for just that Hanja character and certain other information which will be needed by the system to expedite any future Hangeul-Hanja conversion routines performed on that Hanja character (such as finding the next Hanja candidate for the Yomi if the default is not what the user wanted).

FIG. 7—NORMALIZED HANJA STRING

Figure 4:
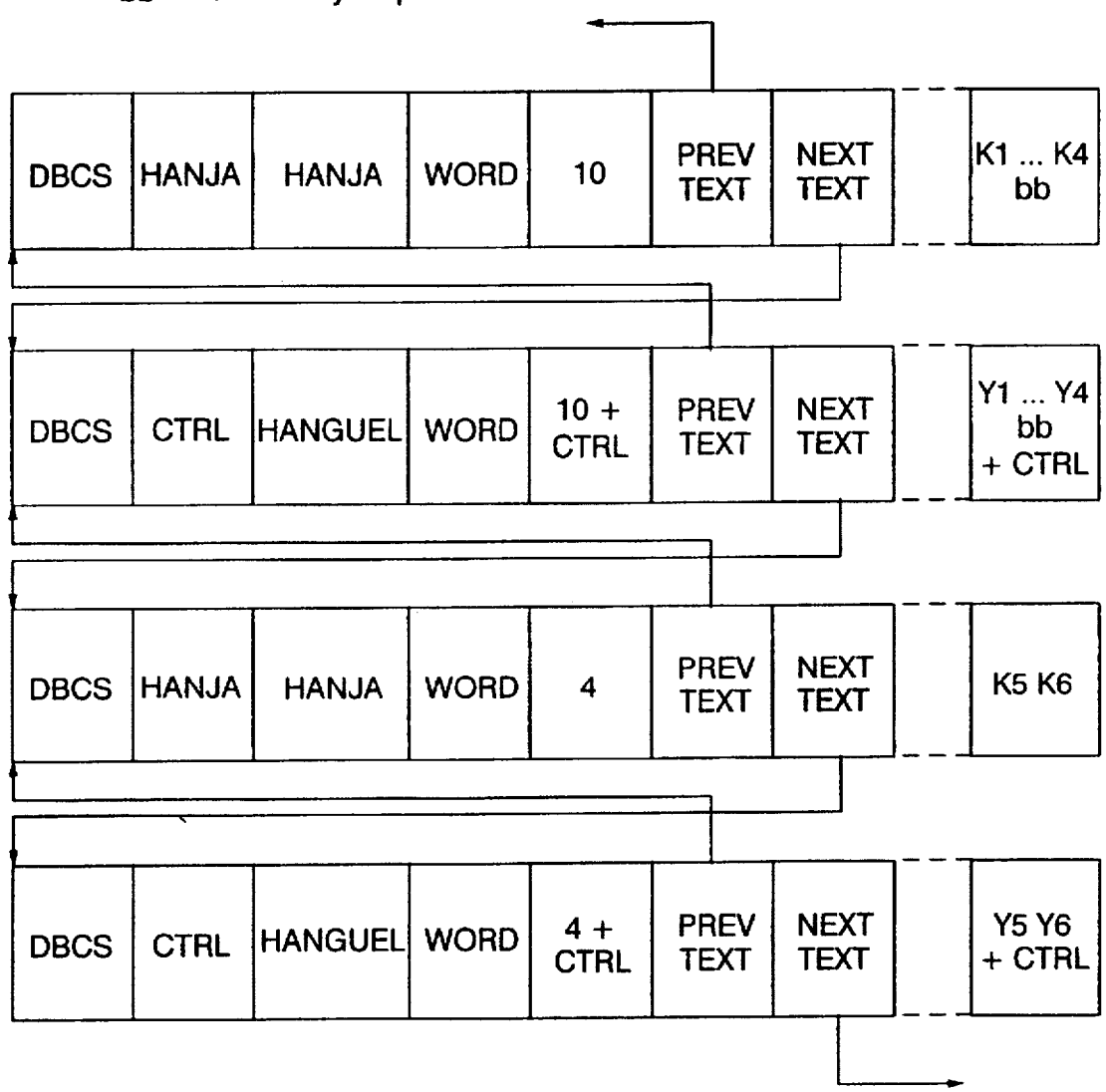
FIG. 4 shows a text node for a converted Hanja string, in the word mode.
Figures 6, 6A:
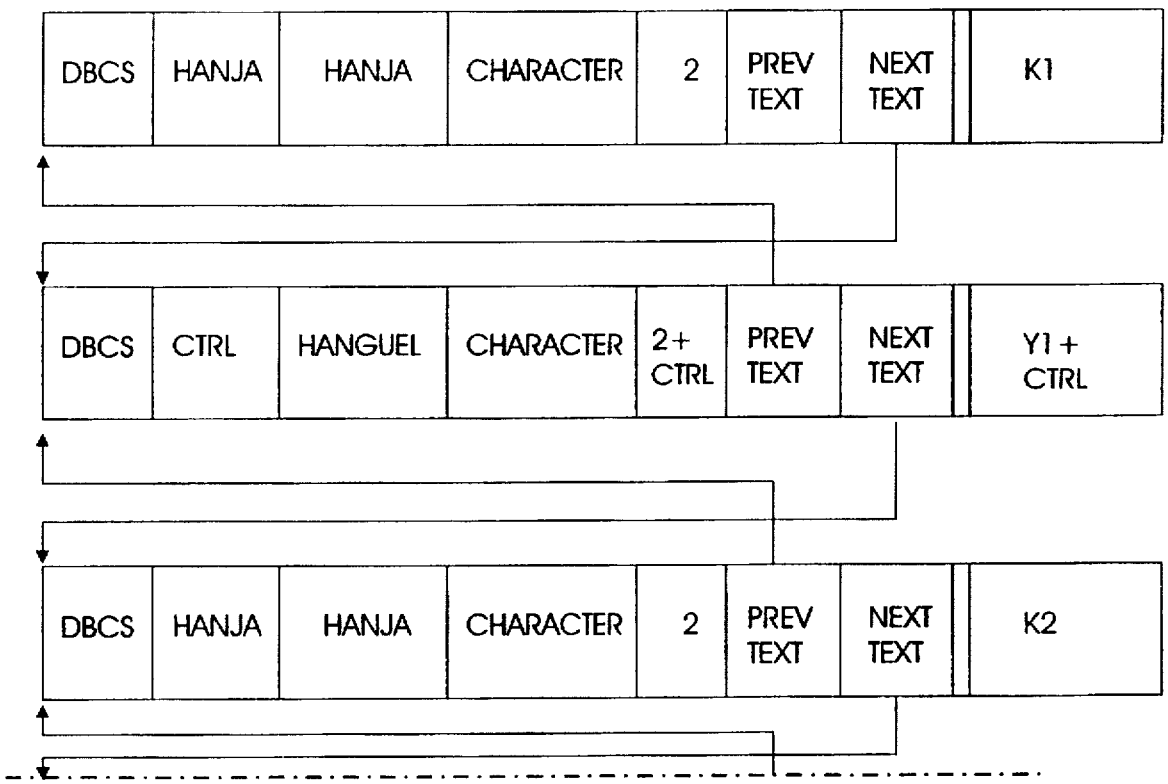
FIG. 6 consisting of FIGS. 6A–6C as shown, shows a text node for a converted Hanja string in the character mode.
Figure 6C:
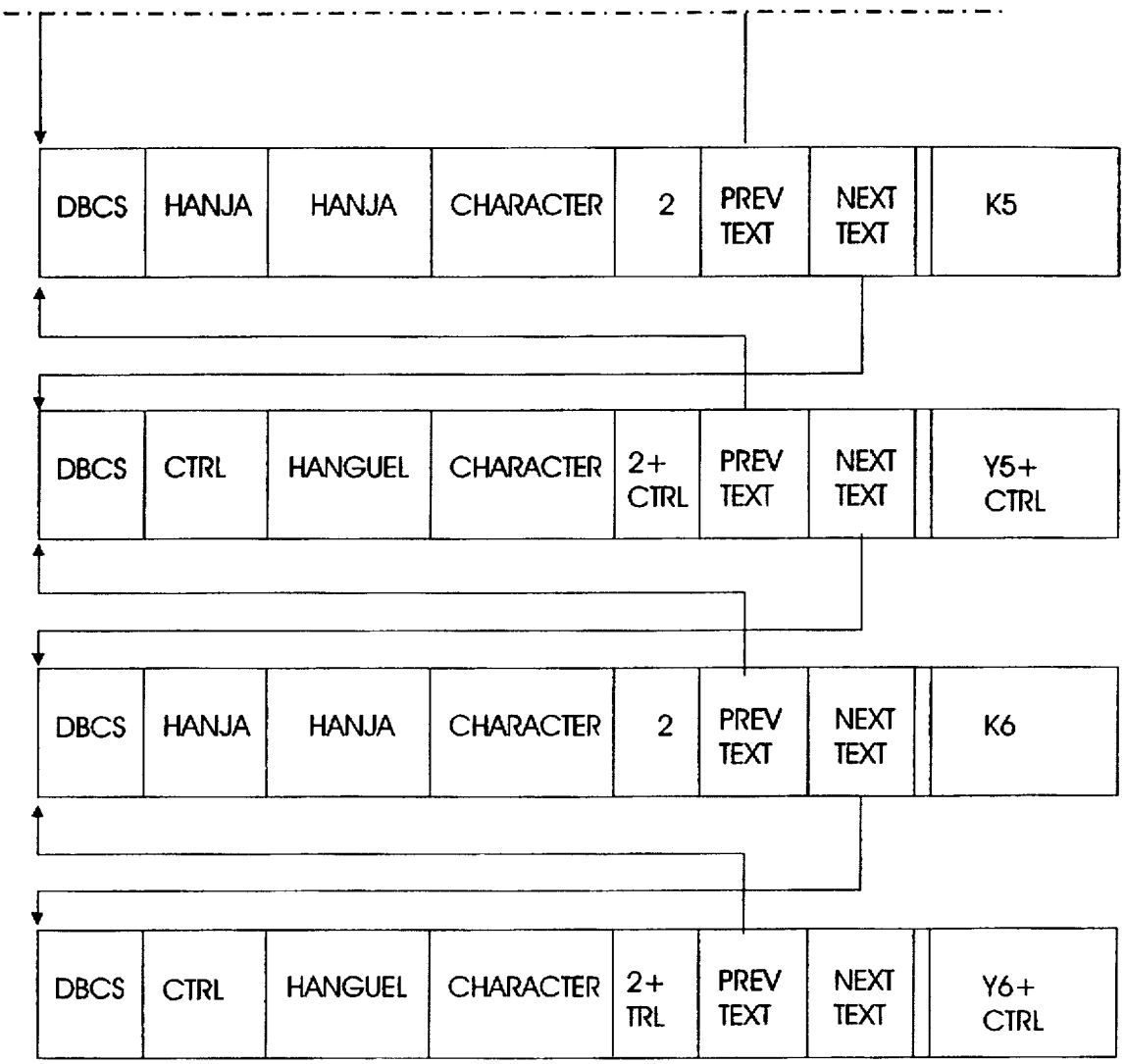
Figure 7:
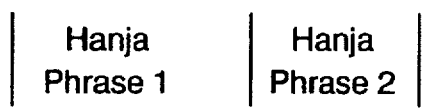
FIG. 7 shows a normalized Hanja string.
Figure 7:
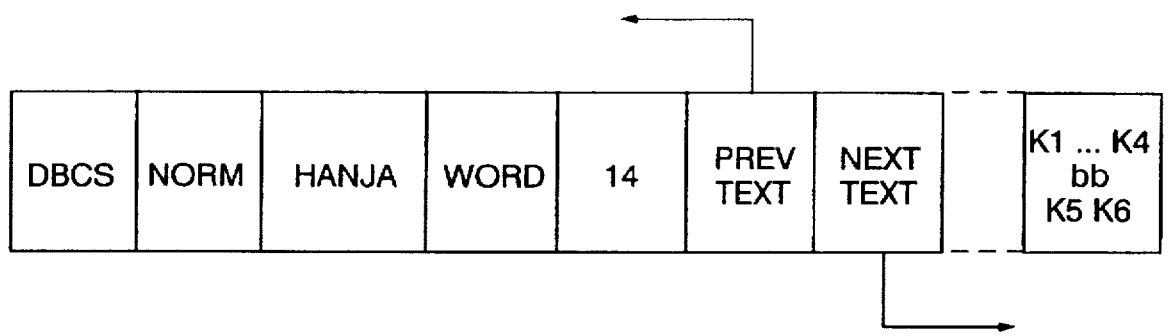
Figure 8:
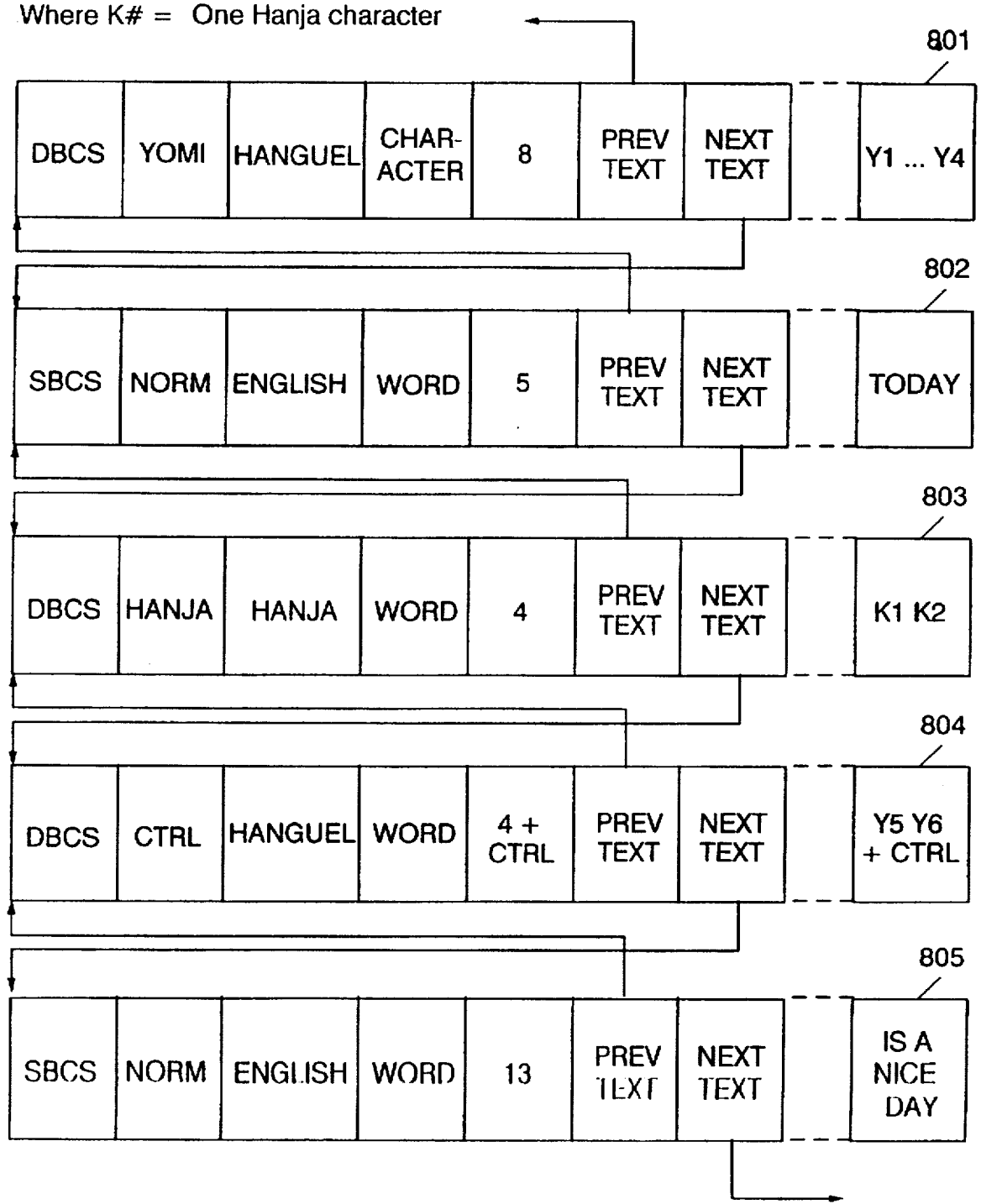
FIG. 8 shows a text node for a mixed Hangeul and Hanja and English string.

This text string is double-byte Hanja text in normalized state. The text combines many text nodes in FIGS. 4 or 6, into one text node for the Hanja phrase. The Yomi/Control information is gone at the request of the user and all the Hanja characters are combined into one text node. Therefore, the text is no longer a candidate for Hangeul-Hanja conversion routines.

FIG. 8—MIXED YOMI/HANJA/ENGLISH STRING

This text string is made up of the following:

A double-byte Hangeul string, 801, in Yomi state taking up one text node with the character conversion flag.

A single-byte English string, 802, in normal state taking up one text node.

A double-byte Hanja string in Hanja state taking up two text nodes, one for the Hanja, 803, and one for the control data, 804. The text in this node was converted using word conversion.

A second single-byte English string, 805, in normal state taking up one text node.

FIG. 9A is a flow diagram of a sequence of operational steps for setting the conversion mode flag and for creating a text node. The method 900 shown in FIG. 9A begins when the operator begins typing the first character at at the keyboard 112. Step 904 determines if the current key being depressed is a conversion mode key. Step 906 then determines the state of the conversion mode key if it is being depressed. Step 908 establishes that the conversion mode key has been depressed and that the state is the character state, so the conversion mode flag is set equal to zero indicating character mode in the text node. Alternately, if step 906 determines that the conversion mode key state is for the word conversion state, then step 910 sets the conversion mode flag equal to one in the text node to indicate word conversion.

If step 904 determines that it is not the conversion key that has been depressed, then step 912 determines if the conversion command key has been depressed. If it has, then step 914 gets the current document position. The current document position is where the cursor is along the character string that is being typed and displayed on the screen of the display 112. Then step 916 determines whether the document position is in a Yomi string. If it is in a Yomi string, then step 918 converts the Hangeul or Yomi state characters into the Hanja characters. This sequence is shown in the flow diagram of FIG. 9B which will be described later. Alternately, if step 916 determines that the document position is not in the Yomi state, then the flow diagram flows to step 936 which indicates an error condition is present. Typically this will result in the processor of FIG. 1 giving an audible beep sound to the operator and then the flow diagram will return to the input of step 902.

If step 912 determines that it is not a conversion command key that is currently depressed, then step 920 determines if the character which has just been typed by the operator, is a single byte character set (SBCS) character. If the character is determined not to be an SBCS character, then step 924 sets the double byte character set (DBCS) flag equal to one in the text node. Alternately, if step 920 determines that it is a single byte character (SBCS) character that has been typed, then step 922 sets the double byte character string (DBCS) flag equal to zero in the text node. In order to allow for the switching between single byte character and double character set strings in later steps 928, 930, 932 and 934, the setting of the DBCS flag to zero in step 922 or to the flag to one in step 924 can be buffered in the memory 100, until a determination is made as to the current document position. This will become clear in the following description.

Steps 922 and 924 then flow to the step 926 which checks the current document position, that is the position of the cursor in the character string being typed and displayed on the display screen. Step 928 then determines if the DBCS flag is zero and the document position indicates SBCS. If it does, then step 946 inserts the character which has just been typed into the text node, reformats the document in step 947, displays the character 948, and returns to the input step 902.

Alternately, if step 928 determines that a DBCS flag is zero but the document position is not SBCS, then 928 flows to step 930. Step 930 determines that the DBCS flag is zero and the document position is DBCS. This means that there is a single byte character which has just been typed, but the document position is currently in a double byte character set region. If this is true, then step 930 flows to step 938 which creates a single byte character set text node. The single byte character set text node has the character inserted in it in step 946. Step 947 reformats the document and step 948 displays the character and then flow returns to step 902. Since the state of the conversion mode has not changed, the newly created SBCS text node created by step 938, will include the current value for the conversion mode flag which was established by either step 908 or step 910, as previously discussed.

If the answer to the decision in step 930 is no, then step 932 determines that the current character is a DBCS character and that the current document position is SBCS, and if this is true, then step 940 creates a DBCS text node. Then a determination is made in step 941 whether the conversion mode flag is in the character mode for a flag equal to zero, or alternately in a word mode for a flag equal to one. If the conversion mode flag is for character mode, the step 942 sets the conversion mode flag equal to zero in the text node of the newly created DBCS text node. Then step 942 flows to step 946 to insert the character in the text node, and after reformatting in step 947 and the display of the character in step 948, the program flows to step 902. Alternately, if step 941 determines that the conversion mode is for the word mode with the flag equal to one, then step 944 sets the conversion mode flag equal to one in the text node of the newly created DBCS text node. Then the program flows through steps 946, 947 and 948 back to the input step 902.

If the answer to step 932 is no, then step 934 determines that the double byte character set character is in a double byte character set document position. If the answer is yes to step 934, then the character is inserted into the text node in step 946, and steps 947 and 948 reformat the document and display the character, and then the program flows to the input step 902. If the answer to step 934 is no, then an error condition is noted in step 936. The program then flows to the input step 902.

In step 934, if the character is a DBCS character and the document position is in DBCS, then a further determination must be made in step 935 concerning the conversion mode flag. If the conversion mode flag set in step 908 is different than the conversion mode flag in the current document position as reflected in the text node for the characters immediately preceding the currently typed character, then step 935 merely inserts the character into the current text node in step 946 and proceeds through steps 947, 948 to the input step 902. However, after step 934 determines that DBCS characters typed and the current document position is DBCS, if step 935 determines that the conversion mode has changed, that is if the conversion mode flag set in step 908 or step 910 and currently buffered in the memory 100, is different from the conversion mode flag in the current text node containing the immediately preceding characters, then step 935 flows to step 940 to create a new DBCS text node. The new DBCS text node will have written into it the changed conversion flag. It will also have written into it the fact that this is a DBCS text node, by virtue of step 940.

This concludes the method for setting the conversion flag and creating the text node for the characters typed at the keyboard 112.

Figures 2, 9B:
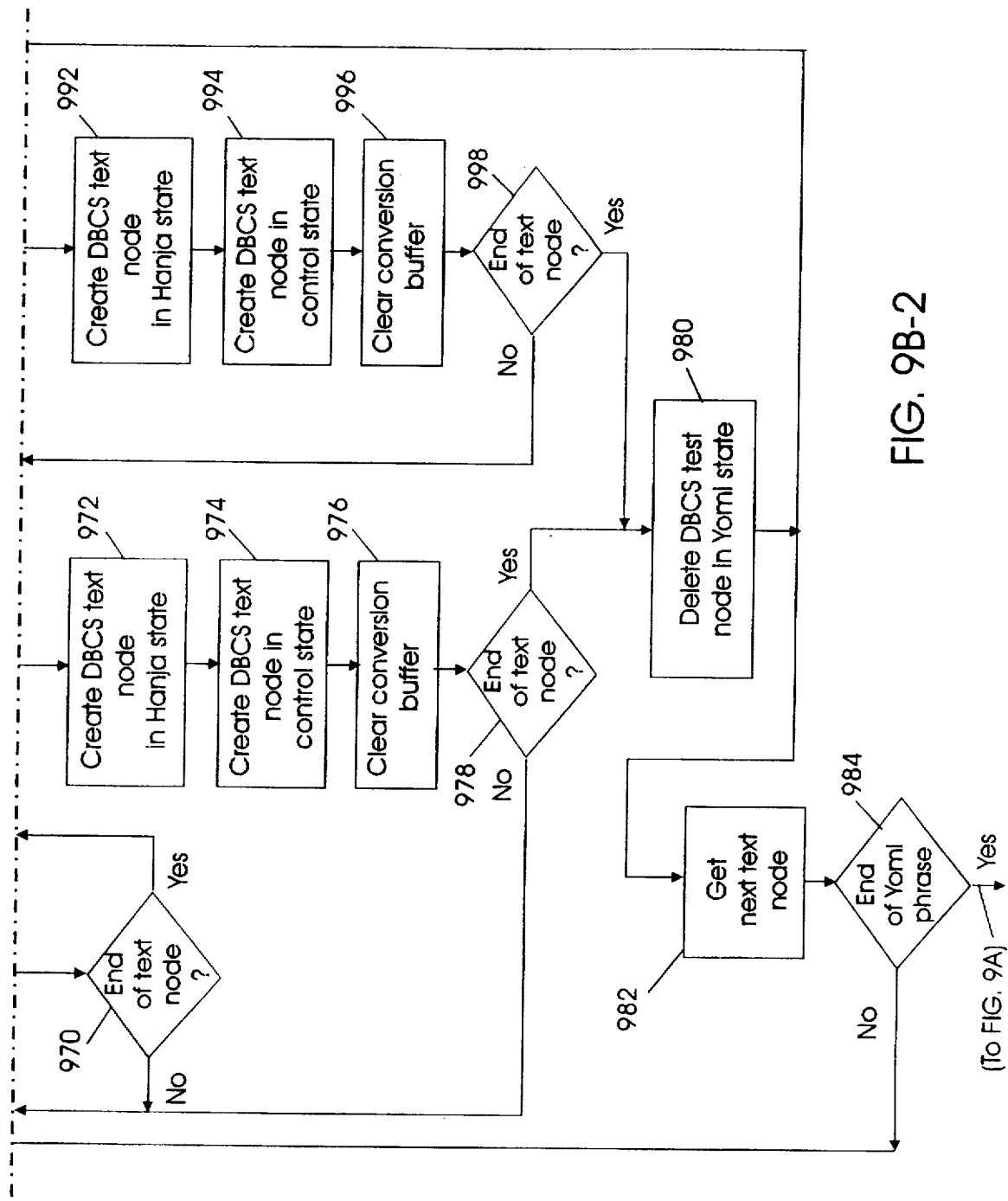
FIG. 9B consisting of FIGS. 9B-1 and 9B-2 as shown, is a flow diagram of a sequence of operational steps to carry out the selected mode conversion from Hangeul characters to Hanja characters, in accordance with the invention.

FIG. 9B is a flow diagram of a sequence of operational steps for converting an active Yomi text node into a Hanja text node. The method 950 in the flow diagram of FIG. 9 begins with the step 952 which goes to the beginning of the Yomi phrase. Refer to the flow diagram in FIG. 9A, where it is shown that step 902 gets a character from the keyboard and then step 912 determines whether that key is a conversion command key. As was previously discussed, if the key is a conversion command key, then step 914 gets the current document position and step 916 determines if the current document position is inactive Yomi text. If this is true, then step 918 branches to the input step 952 of FIG. 9B.

Step 952 goes to the beginning of the Yomi phrase and then step 954 determines whether this is a DBCS text node. If it is not a DBCS text node, then step 956 sets the SBCS text node to the Hanja state text node. The method 950 is responding to the operator's indication that he wants to convert an SBCS text node. Since SBCS text is a subset of Yomi, then step 956 is provided to convert its destination to Hanja state text node. The actual effect of this step is simply for administrative convenience. Step 956 then flows to step 982 which gets the next text node. Step 984 determines whether we are at the end of the Yomi phrase and if we are, then we return to step 947 in FIG. 9A to reformat the document and to display the character in steps 947 and 948 and then return to the input step 902.

In FIG. 9B, if step 954 determines that this is a DBCS text node, then step 958 determines whether the conversion mode flag is equal to one. If the conversion mode flag is equal to one which is the word conversion mode, then step 960 gets the next character. Step 964 determines if the next character is a delimiter such as a blank or a punctuation such as a period or comma. If it is a delimiter, then step 968 converts the Hangeul word in the conversion buffer to the Hanja word. Then step 972 creates the DBCS text node in the Hanja state. Then step 974 creates the DBCS text node in the control state. Step 974 has the purpose of preserving the original Hangeul expression to enable the operator to reconvert the converted Hanja string back into its original Hangeul string for editing or other purposes. Step 974 then flows to step 976 which clears the conversion buffer. Step 978 then determines whether we are at the end of the text node. If we are, then step 978 flows to step 980 which deletes the DBCS text node in the Yomi state. Step 980 has the purpose of freeing the memory by taking the old Yomi state expression and deleting it from the memory, since it has been restated as the new Yomi control state in step 974. Then step 980 proceeds to step 982 which gets the next text node and then if step 984 determines that this is not the end of the Yomi phrase, then the program flows to step 954.

If step 964 determines that the character is not a word delimiter, then step 966 moves the character to the conversion buffer and step 970 determines if we are at the end of a text node. If we are not at the end of the text node, then step 970 flows to step 960 to get the next character. Alternately, if step 970 determines that we are at the end of a text node, then it flows to step 968 which converts the Hangeul word in the conversion buffer into the Hanja word, as previously described.

If step 958 determines that the conversion flag is zero, that is if it is a character conversion mode, then step 958 flows to step 962 which gets the character. Then step 986 determines if the character is a word delimiter. If it is, then add the character to the conversion buffer 988 and the program flows to step 962 to get the next character. However, if step 986 determines that the character is not a word delimiter, then step 990 converts the Hangeul character to the Hanja character. This is the character-by-character mode. Then step 992 creates the DBCS text node in the Hanja state. In the character conversion mode, each character has its own individual text node. Step 994 then creates a DBCS text node in the control state. This preserves the original Yomi character. The original Yomi character is preserved to enable the operator to reconvert back into the Yomi character for editing or other purposes. Then step 996 clears the conversion buffer. Step 998 determines if we are at the end of the text node. If we are not at the end of the text node, then the program flows to step 962 to get the next character. However, if we are at the end of the text node, then step 998 flows to step 980 to delete the DBCS text node in the Yomi state. This is the deletion of the original Hangeul character string, which has now been duplicated as a sequence of individual control state text nodes created by the step 994. Then step 992 gets the next text node. Step 984 determines if this is the end of the Yomi phrase and if it is not, then the program flows to step 954. However, if we are at the end of the Yomi phrase, then step 984 returns back to step 947 of FIG. 9A, to reformat the document, the character is display in 948, and the program then flows to step 902 to get the next character for the keyboard.

In this manner, the method 950 of FIG. 9B converts the active Yomi text nodes into the Hanja text nodes, either in a word mode conversion or alternately in a sequence of text nodes in a character mode conversion.

Although a specific embodiment of the invention has been disclosed, it will be understood by those having skill in the art that changes can be made to that specific embodiment without departing from the spirit and the scope of the invention.

What is claimed is:

1. In a data processing system having a central processor (CPU), a display means, input means, and a memory, a method of steps, effective in said data processing system, for selected conversion of Hangeul characters to Hanja characters found in a structured document which includes Hangeul phrases and Hanja phrases comprising steps for:

inputting and accumulating multiple Hangeul characters from said structured document into said memory of said data processing system;

selecting a conversion mode for converting Hangeul characters to Hanja characters, said conversion mode being chosen from word conversion and character conversion in said data processing system;

responsive to said selecting step, if said selected conversion mode is said character mode, performing in said CPU a table lookup operation in a conversion table in said memory of said data processing system for converting from Hangeul characters to Hanja characters, said table lookup being performed for each consecutive Hangeul character inputted to said data processing system, and retrieving by said CPU for use or display a corresponding Hanja character from said conversion table; and responsive to said selecting step, if said selected conversion mode is said word conversion mode, then locating with said CPU a first delimiter and a second delimiter in said input of Hangeul characters, and performing by said CPU a table lookup in said conversion table in said memory for converting Hangeul words to Hanja characters using, for said conversion, the said Hangeul characters located between said first and said second delimiter, and retrieving by said CPU for use or display the corresponding Hanja characters from said conversion table, constructing in said memory of said data processing system, a text node which includes an indication of the conversion mode selected.

2. The method of claim 1 which said constructing of a text node further comprises including in said text node an indication of a single byte character set or a double byte character set.

3. A conversion tool, for use in a data processing system which includes a processor, memory, input means and a display, for selected conversion of Hangeul characters to Hanja characters found in a structured document which includes Hangeul phrases and Hanja phrases, said tool comprising:

means effective in said processor of said data processing system for accumulating in said memory of said data processing system multiple Hangeul characters;

means effective in said processor of said data processing system for selecting a conversion mode of operation by said processor from word conversion and character conversion of Hangeul characters to Hanja characters;

first table lookup means operable in said processor in response to selection of said conversion mode being said character mode, for performing, for each consecutive Hangeul character, a table lookup operation in a table in said memory, and reporting to said processor a corresponding Hanja character from said table; and second table lookup means effective in said processor in response to selection of said conversion mode being said word conversion mode, for locating a first delimiter and a second delimiter in said Hangeul characters and performing with the said Hangeul characters located between said first and said second delimiter, a table lookup operation in said memory, and reporting to said processor the corresponding Hanja characters from said table, and means for constructing in said memory of said data processing system a text node which includes an indication of the conversion mode selected.

4. The system of claim 3 which further comprises:

means for constructing a text node which includes an indication of DBCS or SBCS characters.

* * * * *